(12) United States Patent
Pellmann et al.

(10) Patent No.: US 11,382,274 B2
(45) Date of Patent: Jul. 12, 2022

(54) SEPARATION ARRANGEMENT FOR A COMBINE HARVESTER

(71) Applicant: CLAAS Selbstfahrende Erntemaschinen GmbH, Harsewinkel (DE)

(72) Inventors: Markus Pellmann, Sassenberg (DE); Jens Bussmann, Ostercappeln (DE); Bernd Holtmann, Sendenhorst (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 329 days.

(21) Appl. No.: 16/784,524

(22) Filed: Feb. 7, 2020

(65) Prior Publication Data

US 2020/0337245 A1    Oct. 29, 2020

(30) Foreign Application Priority Data

Apr. 29, 2019   (DE) .................... 10 2019 110 990.6

(51) Int. Cl.
| | | |
|---|---|---|
| *A01F 12/39* | (2006.01) | |
| *A01F 7/06* | (2006.01) | |
| *A01D 41/12* | (2006.01) | |

(52) U.S. Cl.
CPC .............. *A01F 12/39* (2013.01); *A01F 7/067* (2013.01); *A01D 41/12* (2013.01)

(58) Field of Classification Search
CPC .......... A01F 12/39; A01F 7/067; A01F 12/10; A01F 7/06; A01D 41/12
See application file for complete search history.

(56) References Cited

U.S. PATENT DOCUMENTS

| | | | | | |
|---|---|---|---|---|---|
| 3,994,304 | A | * | 11/1976 | Todd .......................... | A01F 7/06 460/70 |
| 4,328,815 | A | * | 5/1982 | Rowland-Hill ......... | A01F 12/10 460/16 |

(Continued)

FOREIGN PATENT DOCUMENTS

| | | |
|---|---|---|
| CN | 205 166 048 U | 4/2016 |
| EP | 2965614 A1 | 1/2016 |

(Continued)

OTHER PUBLICATIONS

European Search Report dated Aug. 13, 2020 issued in the corresponding European Application No. 20 15 1419 (with English translation of the relevant parts).

*Primary Examiner* — Arpad Fabian-Kovacs
(74) *Attorney, Agent, or Firm* — Collard & Roe, P.C.

(57) ABSTRACT

A separator arrangement has an inlet head housing, a feed drum and two axial separating rotors projecting by one end portionwise into the inlet head housing. The inlet head housing has planar inlet portions which extend over the width of the respective axial separating rotor and between which is arranged a ramp-shaped housing portion extending paraxial to the conveying direction of the axial separating rotors and which assists in dividing a harvested material flow into partial flows to be fed to the axial separating rotors. At least one separating element is associated with the ramp-shaped housing portion and has a base body which extends perpendicular to the surface of the housing portion and which has an end face formed as a cutting edge. A coating comprising a wear-resistant second material is arranged on the end face and extends substantially medially in the longitudinal direction of the end face.

10 Claims, 5 Drawing Sheets

(56) References Cited

U.S. PATENT DOCUMENTS

| | | | |
|---|---|---|---|
| 4,733,672 A * | 3/1988 | Tophinke | A01D 41/12 460/80 |
| 4,875,890 A * | 10/1989 | Margerum | A01F 7/06 460/68 |
| 6,129,629 A * | 10/2000 | Dammann | A01F 12/442 460/80 |
| 9,706,714 B2 | 7/2017 | Bussmann et al. | |
| 10,045,487 B1 * | 8/2018 | Robertson | A01F 7/067 |
| 2002/0045469 A1 * | 4/2002 | Schwersmann | A01F 7/06 460/68 |
| 2002/0086721 A1 * | 7/2002 | Schwersmann | A01F 12/10 56/80 |
| 2007/0251368 A1 | 11/2007 | McFarlane | |
| 2007/0261867 A1 | 11/2007 | Techel et al. | |
| 2012/0100898 A1 * | 4/2012 | Mygind | A01F 12/10 460/22 |
| 2015/0087363 A1 * | 3/2015 | Holtmann | A01F 12/24 460/75 |
| 2016/0007536 A1 * | 1/2016 | Bussmann | A01D 41/12 460/83 |
| 2016/0073582 A1 * | 3/2016 | Stoffel | B23K 26/34 219/76.1 |
| 2016/0309648 A1 | 10/2016 | Stoffel et al. | |
| 2016/0353662 A1 * | 12/2016 | Haus | A01F 12/24 |
| 2017/0079212 A1 * | 3/2017 | Bok | A01F 12/10 |
| 2019/0281760 A1 * | 9/2019 | Mayerle | B21D 53/647 |
| 2020/0107502 A1 * | 4/2020 | Mayerle | A01D 41/1243 |
| 2020/0352105 A1 * | 11/2020 | Singh | A01F 12/30 |

FOREIGN PATENT DOCUMENTS

| | | |
|---|---|---|
| EP | 3 000 308 A1 | 3/2016 |
| EP | 3 031 316 A1 | 6/2016 |

* cited by examiner

SEPARATION ARRANGEMENT FOR A COMBINE HARVESTER

CROSS-REFERENCE TO RELATED APPLICATIONS

This application claims priority under 35 USC 119 of German Application No. DE102019110990.6, filed on Apr. 29, 2019, the disclosure of which is herein incorporated by reference.

BACKGROUND OF THE INVENTION

The present invention is directed to a separator arrangement and to a combine harvester with a separator arrangement.

A separator arrangement and a combine harvester with a separator arrangement are known from EP 2 965 614 B1. The separator arrangement comprises an inlet head housing, a feed drum and two axial separating rotors projecting by one end portionwise into the inlet head housing. The harvested material is fed through the tangentially conveying feed drum which is arranged above the inlet portion in front of the openings of the axial separating rotors. The inlet housing has a planar inlet portion which extends over the width of the respective axial separating rotor and between which is arranged a ramp-shaped housing portion extending paraxial to the conveying direction of the axial separating rotors and which assists in dividing a harvested material flow which is supplied by the feed drum and which is chiefly made up of stems and stalks, or the like, into partial flows to be fed to the axial separating rotors. At least one separating element which comprises a first material and which extends portionwise in circumferential direction of the feed drum is arranged on the ramp-shaped housing portion. The ramp-shaped housing portion ascending in vertical direction and the separating element arranged on the latter have a concave profile and serve to assist in separating and dividing the supplied harvested material in order to achieve a uniform charging of the axial separating rotors with harvested material. In so doing, the separating element acts as a cutting knife on the harvested material flowing over it, i.e., it severs and cuts up the harvested material as it passes the separating element. The working life particularly of the separating element which projects portionwise into the flow of harvested material is limited due to the abrasive effect of the harvested material flowing over it.

SUMMARY OF THE INVENTION

It is the object of the present invention to further develop a separator arrangement of the type mentioned above which is characterized by a longer working life.

The above-stated object is met according to the invention by a separator arrangement which comprises an inlet head housing, a feed drum and two axial separating rotors projecting by one end portionwise into the inlet head housing. The inlet head housing has, in each instance, a planar inlet portion which extends over the width of the respective axial separating rotor and between which is arranged a ramp-shaped housing portion extending paraxial to the conveying direction of the axial separating rotors and which assists in dividing a harvested material flow which is supplied by the feed drum into partial flows to be fed to the axial separating rotors. At least one separating element comprising at least a first material is associated with the ramp-shaped housing portion. The at least one separating element has a base body which extends perpendicular to the surface of the housing portion and which has an end face formed at least partially as a cutting edge. A coating comprising a wear-resistant second material is arranged on at least portions of the end face and extends substantially medially in longitudinal direction of the end face. The coating is applied substantially as a strip-shaped or ribbon-shaped portion having a width that is smaller than the total width of the end face. In this way, the areas of the end face which comprise the first material and which are adjacent to the coating are exposed to greater wear, i.e., are more extensively abraded, during the operation of the separator arrangement. This results in the effect of a symmetrical, self-sharpening geometry of the cutting edges. Further, the geometry and/or the working life of the cutting edge can be influenced by varying the first material. For example, the use of a softer first material for the base body can lead to a sharper cutting edge because the surfaces laterally adjacent to the cutting edge wear faster than the end face which is provided with a coating of the wear-resistant second material at least on portions thereof.

In particular, the separating element can be detachably arranged at the housing portion. A simpler exchange or a simpler retrofitting of the separating element can be achieved in this way.

Preferably, the first material may be a high-strength steel and the second material may be a metal matrix composite. The metal matrix composite can be, for example, tungsten carbide or cast tungsten carbide with a matrix of an iron alloy, a nickel alloy or nickel.

The coating can preferably be applied by means of cladding. In particular, the coating can be applied by means of laser cladding or plasma powder cladding. In a particularly preferable matter, laser cladding can be used because, with laser cladding, the separating element to be coated is exposed to less heat compared to conventional cladding.

In particular, the end face can have a substantially wavy profile. Alternatively, the end face can have a substantially sawtooth-shaped profile. The cutting effect or separating effect can be influenced depending on the shape of the profile on the end face forming the cutting edge of the separating element. Due to the exchangeability, the separating element can be exchanged depending on the harvested material to be processed.

The coating can preferably extend over the entire longitudinal extent of the end face. This is advantageous for technical aspects pertaining to manufacturing, among others. Further, a continuous, wear-resistant cutting edge is produced on the end face in this way.

According to a preferred embodiment form, the end face can have a substantially serrated or sawtooth-shaped profile. The serrated or sawtooth-shaped profile is formed of substantially horizontal portions and substantially vertical portions extending perpendicular thereto, which horizontal portions and vertical portions extend alternately in longitudinal direction of the separating element. The serrated or sawtooth-shaped profile acts more aggressively on the harvested material compared to the wavy profile of the end face.

The coating may be applied only to the substantially vertical portions extending perpendicular to the horizontal portions. This reduces the technical manufacture-related expenditure on coating. The coating may be applied only to the end faces of the vertical portions of the separating element which, in accordance with the rotational direction of the feed drum, are brought into separating or cutting engagement with the harvested material flow to be conveyed and which are thus exposed to the greatest amount wear. The horizontal portions are exposed to considerably less wear so that, in this case, a sufficient working life can be achieved by selecting a suitable first material even without coating with the second material.

Further, the feed drum can be provided in the area of the ramp-shaped housing portion with a plurality of separating elements arranged one behind the other in circumferential direction. The separating elements are arranged in a central area of the feed drum. Accordingly, the cutting effect and separating effect can be enhanced through a cooperation with the separating element arranged at the housing portion.

In particular, two separating elements of the feed drum can each be arranged in pairs adjacent to one another, and the separating elements of each pair are arranged to converge toward one another in rotational direction of the feed drum. Due to the resulting wedge shape of a pair of separating elements, the separating element at the housing portion functions as a counter-knife for the respective apex of the pair of separating elements on the rotating feed drum.

The above-stated object is further met by a combine harvester with a separator arrangement, in which the separator arrangement can be provided as a separating device which operates according to the principle of axial flow, and a threshing device operating according to the principle of tangential flow is arranged upstream of the separating device. The separator arrangement may also be constructed as a threshing and separating device operating according to the principal of axial flow in which the threshing process and the separating process are carried out jointly by suitably constructed axial separating rotors.

BRIEF DESCRIPTION OF THE DRAWINGS

The present invention will be described in more detail in the following referring to an embodiment example depicted in the drawings. In the drawings.

DETAILED DESCRIPTION OF THE EMBODIMENTS

Figure 1:
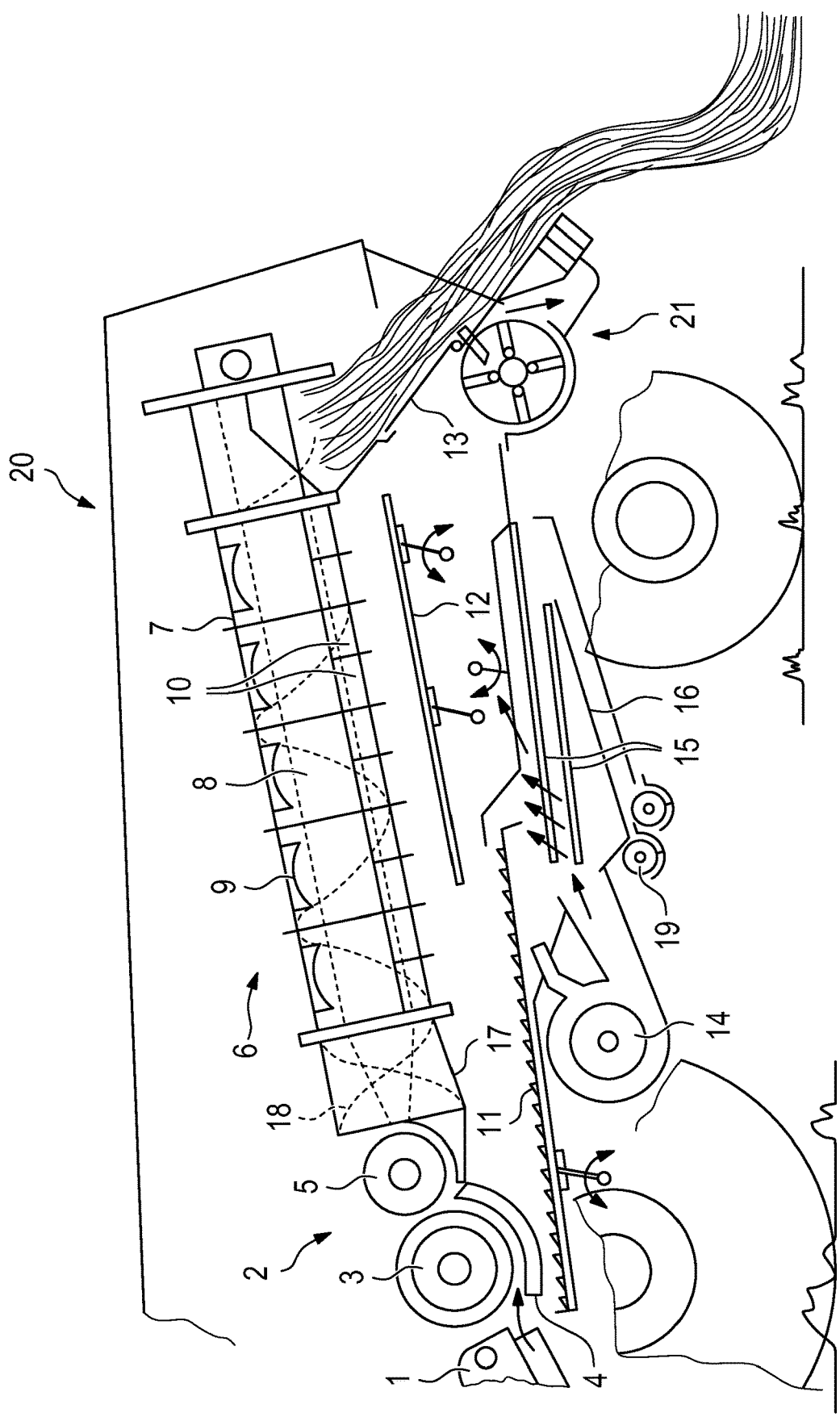
FIG. 1 shows a schematic partial view of a self-propelled combine harvester.

The diagram in FIG. 1 shows a schematic partial view of a combine harvester 20. In the front area, not shown, of the combine harvester 20, harvested material to be processed is received by a header and by a conveying device 1 of a tangentially acting threshing device 2, which conveying device 1 is formed as an inclined conveyor and is only depicted in rudimentary fashion. The threshing device 2 comprises at least one threshing drum 3 with an axis which is oriented transverse to the driving direction of the combine harvester 20 and which is surrounded along part of its circumference by a threshing concave 4. A partial flow of the harvested material processed by the threshing device 2 arrives through openings in the threshing concave 4 on a conveying floor 11 located below the latter.

However, a larger partial flow of harvested material is guided between the threshing drum 3 and threshing concave 4 and with the assistance of a guide drum or feed drum 5 is fed to a separator arrangement 6 operating on the principle of axial flow. The schematically depicted separator arrangement 6 is constructed as at least one cylindrical housing 7 which is open at its ends and in which two axial separating rotors 8 formed as conveying member are supported over the entire length of the housing 7 so as to be drivable in rotation. Due to the oppositely running rotation of the axial separating rotors 8, the harvested material is conveyed on a helical path through the separator arrangement 6. Ribs 9 protruding from an upper side of the housing 7 in the interior thereof promote the kneading of the harvested material when the outer edge of a helix 18 of the axial separating rotor 8 is guided past them. The lower area of the housing 7 is formed by separating concaves 10. The front end of the axial separating rotor 8 extends into an inlet head housing 17 which is shown in more detail in FIG. 2.

The constituent parts of the partial flow delivered by the separator arrangement 6, essentially grain, chaff and short straw which are sorted out of the separator arrangement 6 through openings in the separating concaves 10, fall onto a conveying floor 11 or a return pan 12, respectively, located below.

The coarse straw from which grain has largely been removed during passage through the separator arrangement 6 is ejected at the rear end of the separator arrangement 6 and falls via a chute 13 onto the ground or is fed to a chopping and distributing device 21. The threshing device 2 and the separator arrangement 6 accordingly form a first separating stage.

A second separating stage or cleaning stage substantially comprises a blower 14 and a group of sieve pans 15 located in the airflow of the blower 14. The sieve pans 15 are driven to oscillate in a frame, not shown, and charged with the pre-cleaned partial flow of harvested material coming from the conveying floor 11. The grain contained in the pre-cleaned partial flow trickles through the oscillating sieve pans 15 onto a slanted first guide floor 16. A conveyor auger 19 is arranged at the lower end of the guide floor 16 and conveys the grain to an elevator and, by way of the latter, into a grain tank.

Figure 2:
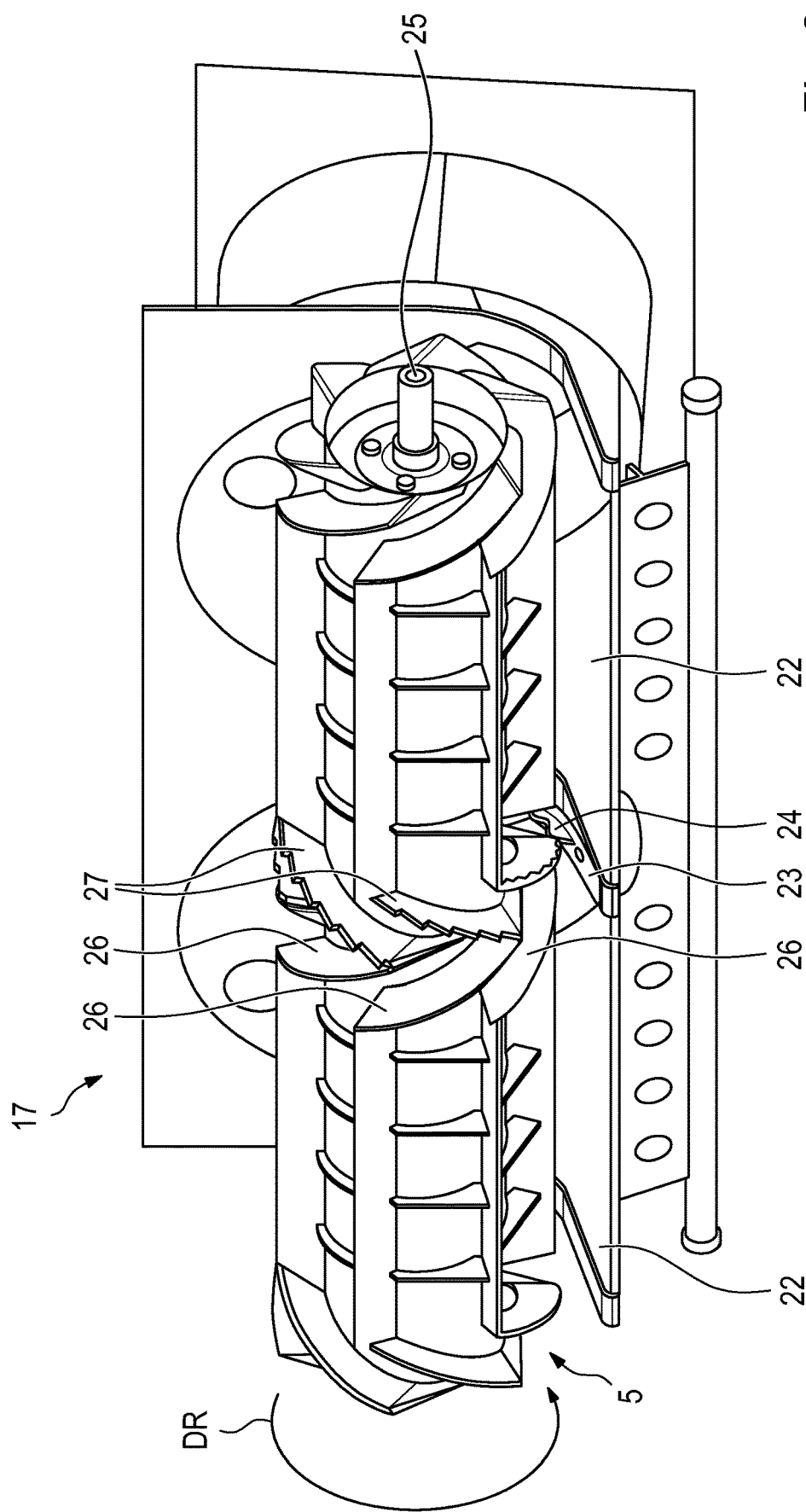
FIG. 2 shows an isometric view of an inlet head housing of a separator arrangement.
Figure 3:
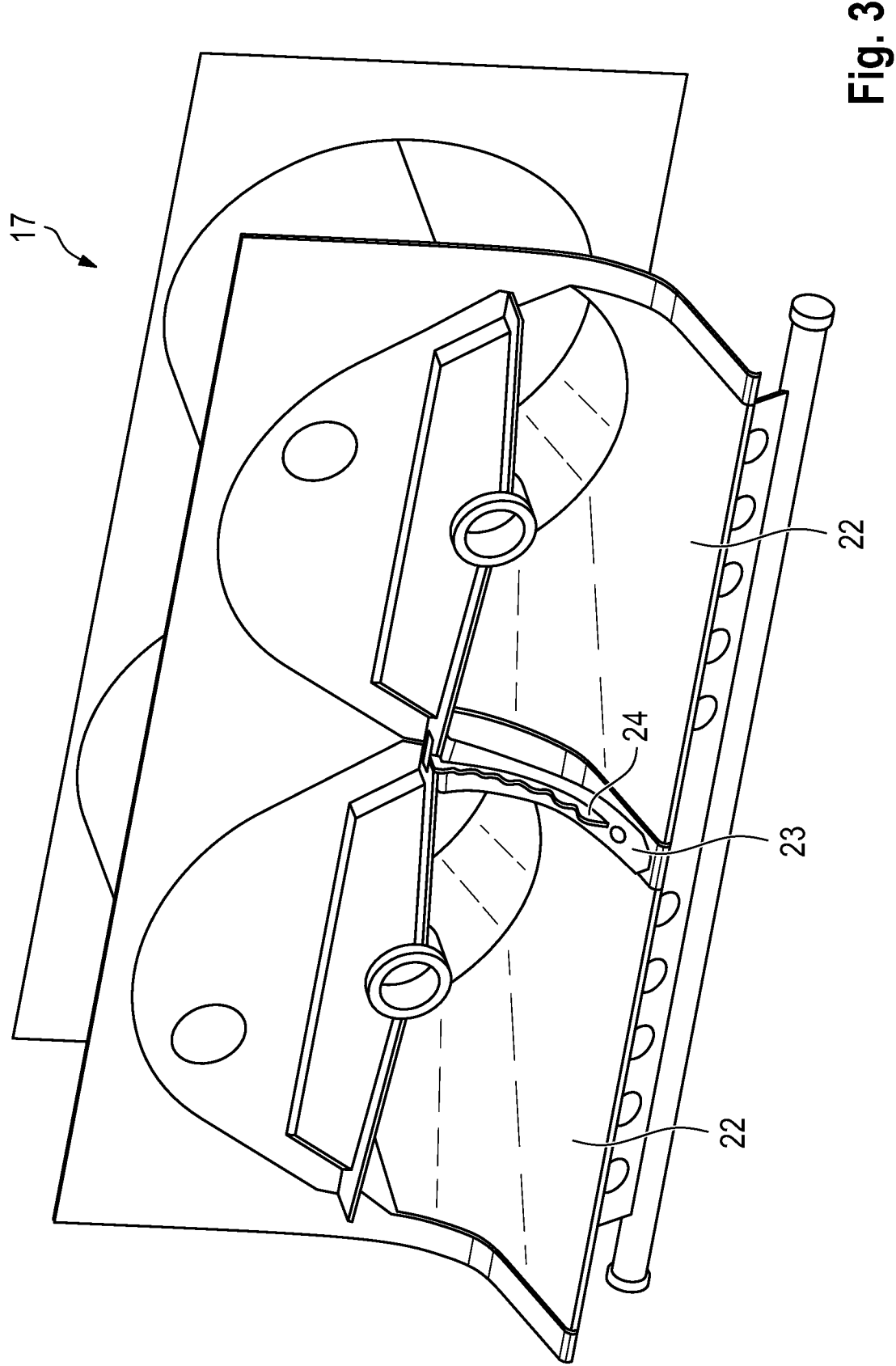
FIG. 3 shows an isometric view of the inlet head housing 17 according to FIG. 2 without a feed drum.

FIG. 2 shows an isometric view of the inlet head housing 17 of the separator arrangement. FIG. 2 shows the inlet head housing 17 with the feed drum which is arranged upstream and which rotates in rotational direction DR around an axis 25. FIG. 3 shows an isometric view of the inlet head housing 17 without the feed drum 5. The inlet head housing 17 has in each instance a planar inlet portion 22 which extends over the width of the corresponding axial separating rotor 8 and which extends portionwise below the feed drum 5. A ramp-shaped housing portion 23 is located between the two inlet portions 21. The ramp-shaped housing portion 23 has a substantially concave profile and extends portionwise in circumferential direction of the feed drum 5. A substantially blade-shaped separating element 24 is arranged on the housing portion 23. The separating element 24 extends substantially in longitudinal direction of the housing portion 23 and has a contour substantially corresponding to that of the housing portion 23. The separating element 24 is preferably detachably arranged at the housing portion 23 to facilitate exchange, for example, in the event of wear or to adapt to different types of harvested material. To this end, the separating element 24 can be screwed to the inlet head housing 17.

The feed drum 5 is provided with a plurality of separating elements 27 arranged one behind the other in circumferential direction in the area of the ramp-shaped housing portion 23. To this end, the feed drum 5 has guide vanes 26 which are arranged or formed in a V-shaped manner in its central area. The guide vanes 26 are arranged one behind the other viewed in circumferential direction of the feed drum 5 and extend outward in radial direction proceeding from the lateral surface of the feed drum 5. The separating elements 27 are arranged at the outer sides of the guide vanes 26. Separating element 24 cooperates with separating elements 27 of the rotating feed drum 5 to separate and cut up harvested material. The stationary separating element 24 presents a kind of counter-knife for the separating knives 27 at the guide vanes 26 of the feed drum 5.

Figure 4:
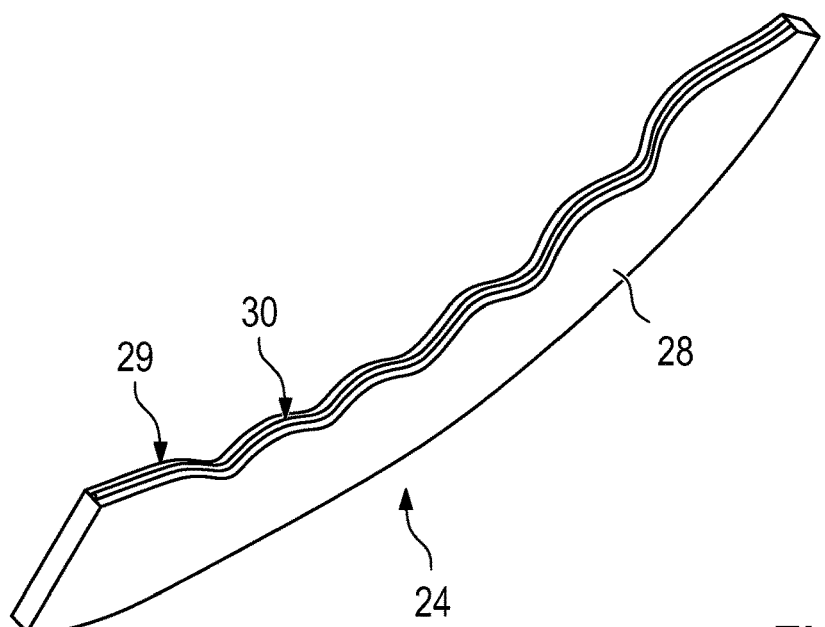
FIG. 4 shows a schematic perspective view of a separating element.

FIG. 4 schematically shows a perspective view of the separating element 24. The separating element 24 has a curved shape which substantially corresponds to the shape of the ramp-shaped housing portion 23 to which the separating element 24 is fastened. Separating element 24 has a base body 28 which extends perpendicular to the surface of the ramp-shaped housing portion 23. The base body 28 has an end face 29 which is formed in some portions as cutting edge and which acts on the harvested material fed from the feed drum 5. Base body 28 comprises a first material, preferably a high-strength steel.

A coating 30 comprising a second material is arranged at least on portions of the end face 29 and extends substantially medially in longitudinal direction of the end face 29. The coating 30 is applied as a substantially strip-shaped or ribbon-shaped portion whose width is smaller than the total width of the end face 29. Accordingly, portions or areas of the end face 29 comprising the first material are formed adjacent to the coating 30 comprising the second material. The second material is characterized by a greater resistance to wear compared to the first material. The second material is a metal matrix composite. The coating 30 comprising the second material is applied by cladding, particularly by laser cladding.

The end face 29 has a substantially wavy profile. The end face 29 may also be formed with a sawtooth-shaped profile. In the depicted embodiment example, the coating 30 extends over the end face 29 of the separating element entirely in longitudinal direction of the separating element 24. In this way, the areas or portions of the end face 29 which comprise the first material and which are adjacent to the coating 30 are exposed to greater wear, i.e., are more extensively abraded, during the operation of the separator arrangement 6. This results in the effect of a symmetrical, self-sharpening geometry of the cutting edge.

Figure 5:
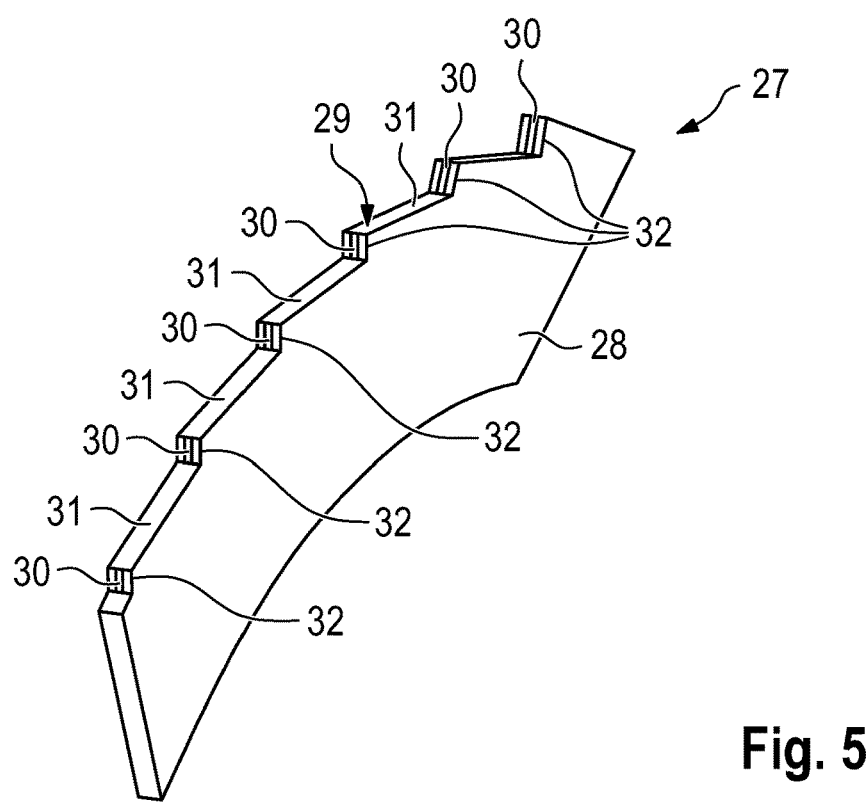
FIG. 5 shows a schematic perspective view of a separating element arranged at the feed drum.

FIG. 5 schematically shows a perspective view of an embodiment form of the separating element 27 arranged at the feed drum 5. The basic construction of the separating element 27 arranged at the feed drum 5 substantially corresponds to that of the separating element 24 arranged on the ramp-shaped housing portion. Identically functioning elements are denoted by like reference numerals. The separating element 27 also has a curved shape. Separating element 27 has an end face 29 formed as a cutting edge. The end face 29 has a substantially serrated or stepped profile. The substantially serrated or stepped profile is formed of substantially horizontal portions 31 and vertical portions 32 extending perpendicular thereto, which horizontal portions and vertical portions extend alternately in longitudinal direction of the separating element 27. A vertical portion 32 is always located at the start of the profile of the separating element 27.

In contrast to separating element 24, the application of the coating 30 in separating element 27 according to the embodiment form shown in FIG. 5 is carried out only in the area of the vertical portions 32. The vertical portions 32 extend radial to the lateral surface of the feed drum 5. Applying the coating 30 only to the vertical portions 32 of separating element 27 which, in accordance with the rotational direction DR of the feed drum 5, are brought into separating or cutting engagement with the harvested material flow to be conveyed and are thus exposed to the greatest amount wear can be sufficient for increasing working life.

Figure 6:
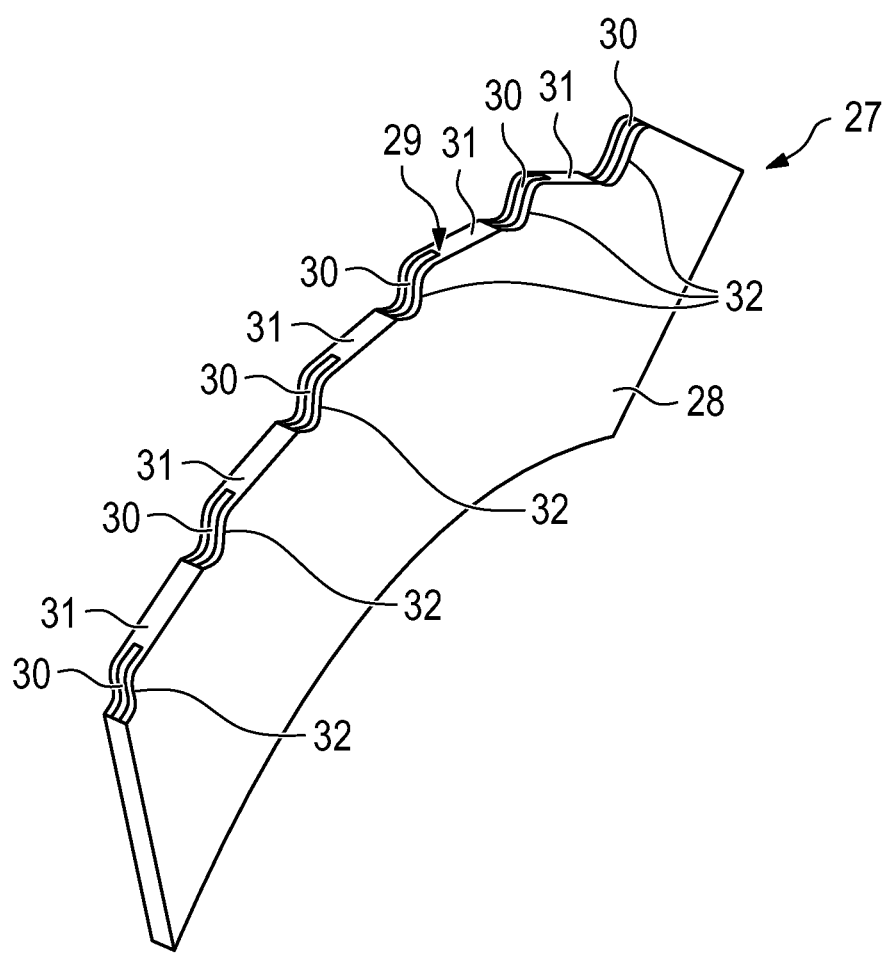
FIG. 6 shows a schematic perspective view of a further embodiment form of the separating element according to FIG. 5.

FIG. 6 schematically shows a perspective view of a further embodiment form of separating element 27 according to FIG. 5. In this case, it is provided that the coating 30 extends completely over the respective vertical portion 32 on the one hand and along portions of the horizontal portion 31 adjoining the respective vertical portion 32 on the other hand. The coating 30 is applied in particular in the area in and after the transition between the vertical portion 32 and the horizontal portion 31 subsequent to it.

In principle, the configuration of the separating elements 27 of the feed drum 5 according to the embodiment forms described above may also be applied to the separating element 24 on the ramp-shaped housing portion 23.

REFERENCE CHARACTERS 1 conveying device
2 threshing device
3 threshing drum
4 threshing concave
5 feed drum
6 separator arrangement
7 housing
8 axial separating rotor
9 ribs
10 separating concave
11 conveying floor
12 return pan
13 chute
14 blower
15 sieve pan
16 guide pan
17 inlet head housing
18 helix
19 conveyor auger
20 combine harvester
21 chopping and distributing device
22 inlet portion
23 housing portion
24 separating element
25 axis
26 guide vane
27 separating element
28 base body
29 end face
30 coating
31 horizontal portion
32 vertical portion
DR rotational direction of 5

What is claimed is:
1. A separator arrangement comprising:
an inlet head housing,
a feed drum, and
two axial separating rotors projecting by one end portionwise into the inlet head housing, wherein the inlet head housing has planar inlet portions which extend over a width of the respective axial separating rotor and between which is arranged a ramp-shaped housing portion extending paraxial to a conveying direction of the axial separating rotors and which assists in dividing a harvested material flow which is supplied by the feed drum into partial flows to be fed to the axial separating rotors, wherein at least one separating element comprising at least a first material is associated with the ramp-shaped housing portion, wherein the at least one separating element has a base body which extends perpendicular to a surface of the housing portion and which has an end face formed at least partially as a cutting edge, and wherein a coating comprising a wear-resistant second material is arranged on at least portions of the end face and extends substantially medially in a longitudinal direction of the end face, and wherein the coating is in the form of a strip-shaped or ribbon-shaped portion having a width that is smaller than a total width of the end face.

2. The separator arrangement according to claim 1, wherein the first material is a high-strength steel and the second material is a metal matrix composite.

3. The separator arrangement according to claim 1, wherein the coating is applied by means of cladding.

4. The separator arrangement according to claim 1, wherein the end face has a substantially wavy profile or a sawtooth-shaped profile.

5. The separator arrangement according to claim 4, wherein the coating extends over an entire longitudinal extent of the end face.

6. The separator arrangement according to claim 1, wherein the end face has a substantially serrated profile, wherein the serrated profile is formed of substantially horizontal portions and substantially vertical portions extending perpendicular thereto, the horizontal portions and vertical portions extending alternately in a longitudinal direction of the separating element.

7. The separator arrangement according to claim 6, wherein the coating is applied only to the vertical portions extending perpendicular to the horizontal portions.

8. The separator arrangement according to claim 1, wherein the at least one separating element comprises a plurality of separating elements, the separating elements being provided on the feed drum in an area of the ramp-shaped housing portion and arranged one behind the other in a circumferential direction.

9. The separator arrangement according to claim 8, wherein two of the separating elements of the feed drum are arranged in pairs adjacent to one another, wherein the separating elements of a pair are arranged to converge toward one another in a rotational direction (DR) of the feed drum.

10. A combine harvester with a separator arrangement constructed according to claim 1.

* * * * *